2 Sheets--Sheet 1.
W. W. HUGHES.
Malt-Driers.
No. 5,602. Reissued Oct. 14, 1873.
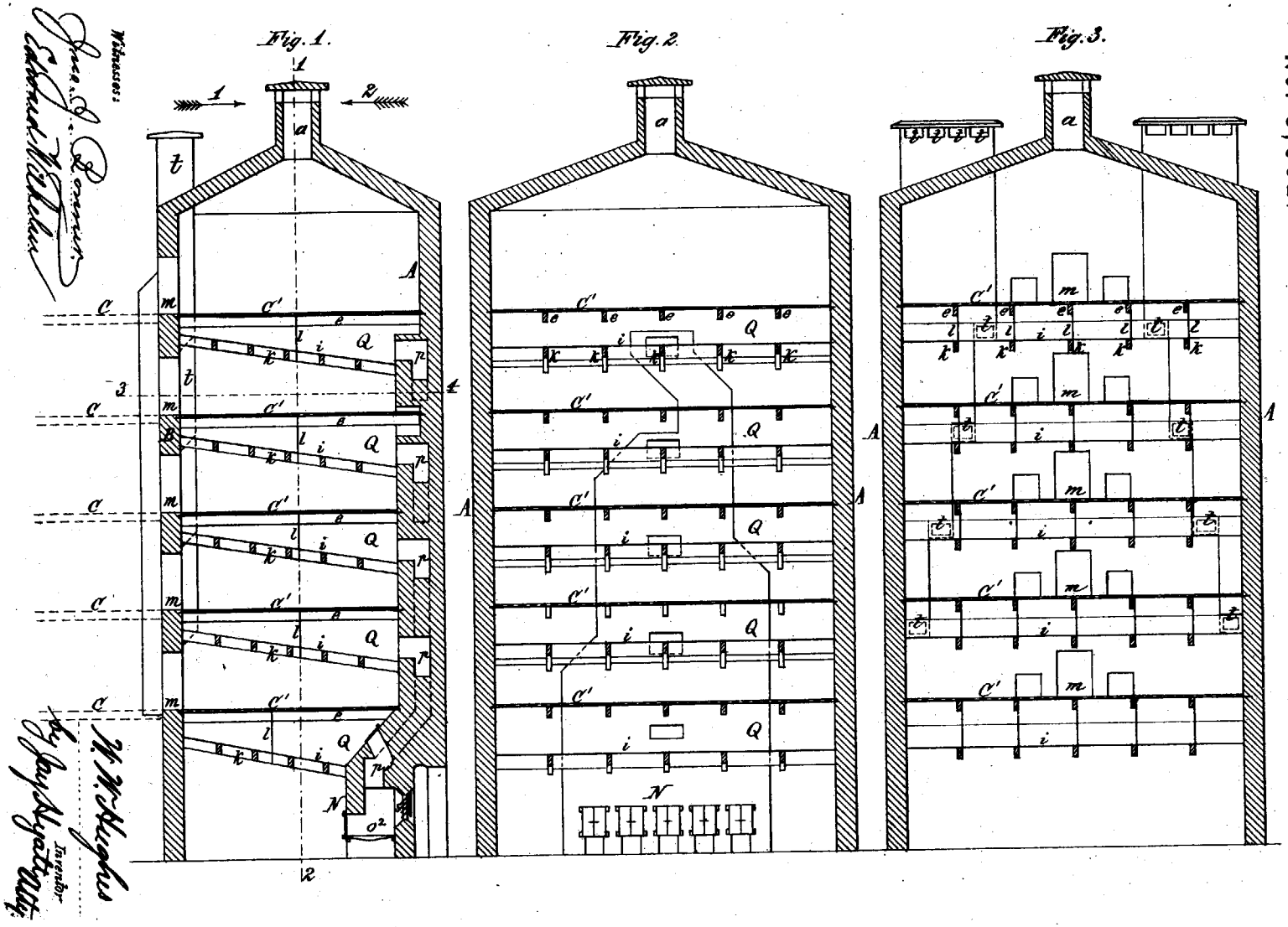
Witnesses:
Jno. J. Bonner
Edward Wakelin
W. W. Hughes
Inventor
by Jay Hyatt Atty.
AM. PHOTO-LITHOGRAPHIC CO. N.Y. (OSBORNE'S PROCESS.)

2 Sheets--Sheet 2.

W. W. HUGHES.

Malt-Driers.

No. 5,602.

Reissued Oct. 14, 1873.

Witnesses

Edward Wilhelm

Jno. J. Bonner.

W. W. Hughes Inventor.

by Jay Hyatt atty.

AM. PHOTO-LITHOGRAPHIC CO. N.Y. (OSBORNE'S PROCESS)

UNITED STATES PATENT OFFICE.

WILLIAM W. HUGHES, OF PHILADELPHIA, PENNSYLVANIA.

IMPROVEMENT IN MALT-DRIERS.

Specification forming part of Letters Patent No. 94,114, dated August 24, 1869; reissue No. 5,602, dated October 14, 1873; application filed July 19, 1873.

*To all whom it may concern:*

Be it known that I, WILLIAM W. HUGHES, of Philadelphia, in the State of Pennsylvania, have invented certain Improvements in Malt-Kilns and Malt-Houses, of which the following is a specification:

My invention consists, first, in a peculiar arrangement of the growing-floors of a malt-house with the drying-floors of a kiln, provided with inclined partitions, for economizing space, facilitating the manipulation of the malt, and insuring a uniform distribution of the heated air through the perforated drying-floors; second, of a certain arrangement of dampers between the furnaces, or in the flues of the same, whereby the heated air may be directed to or excluded from any one or more of the drying-chambers; third, in the construction and arrangement of slatted valves at the back of the fire-chambers for regulating the quantity and temperature of air supplied to the drying-chambers.

Figure 4:
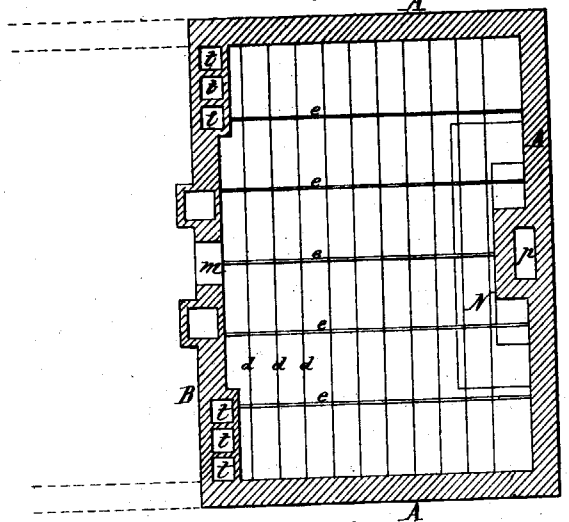
Figure 6:
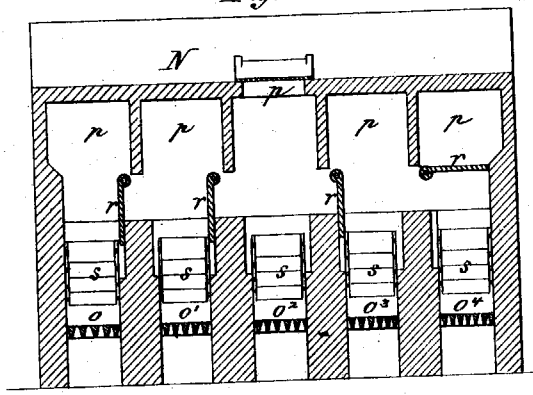
Figure 5:
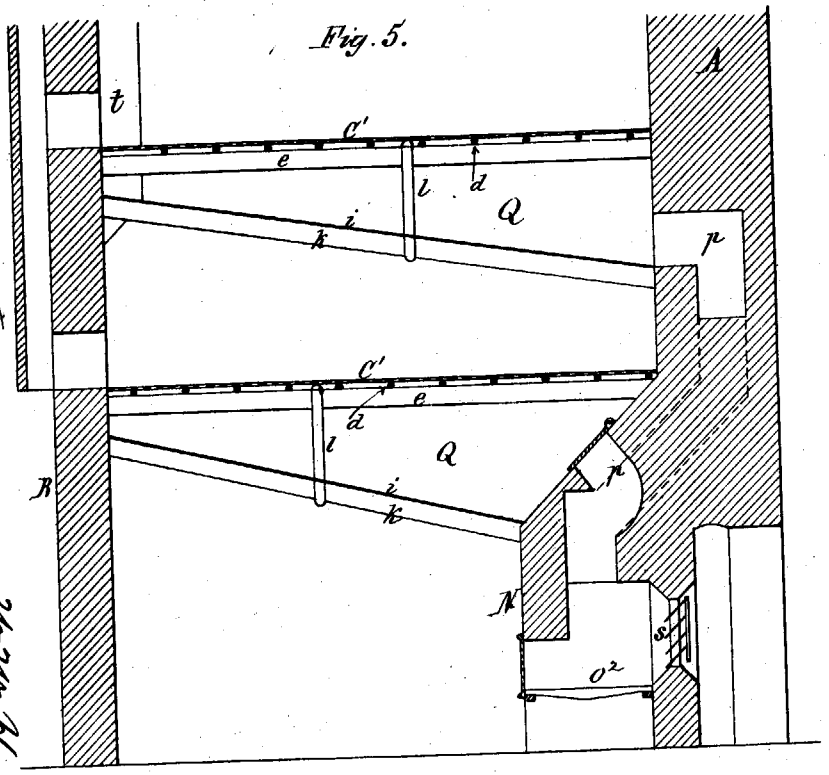

In the accompanying drawing, Figure 1, Sheet 1, is a sectional elevation of my improved malt-kiln; Fig. 2, a transverse sectional elevation on the line 1 2, Fig. 1, looking in the direction of the arrow 1; Fig. 3, a sectional elevation on the line 1 2, Fig. 1, looking in the direction of the arrow 2; Fig. 4, Sheet 2, a sectional plan view of the kiln on the line 3 4, Fig. 1; Fig. 5, a view of the lower portion of Fig. 1, drawn on an enlarged scale; and Fig. 6, a sectional view of the furnace, also enlarged.

Like letters of reference designate like parts in each of the figures.

A A represent the walls of the kiln, and *a* a chimney or ventilator in the center of the roof thereof; B, the partition separating the compartments in which the grain is steeped, germinated, and prepared for drying from the drying floors or compartments. C C are the malting-floors, and C′ C′ the adjacent drying-floors, (five of each being shown in the drawings,) arranged on a level, or nearly so, with the floors C C. Each of the drying-floors consists of a perforated plate of sheet-iron, resting upon metallic rods *d*, which extend transversely across the iron girders *e*, as shown most clearly in Fig. 5. At a short distance beneath each of these drying-floors is an inclined partition, *i*, of sheet-iron, resting upon light iron girders *k*, which are prevented from sagging by hangers *l*, connected to the girders *e*. These partitions *i* incline upward from the outer side of the drying-compartments toward the partition B, in which are formed doors or passages *m*, leading from each malting-floor to the adjacent drying-floor. A furnace, N, Figs. 5 and 6, at the bottom of the kiln, has within it distinct and independent fire-places, $o$ $o^1$ $o^2$, &c., these being, in the presence instance, five in number, to correspond with the number of drying-chambers. These fire-places communicate, by means of flues *p*, respectively, with the spaces Q beneath the drying-chambers, as shown in Figs. 1 and 5. In the furnace, between the fire-places and the lower ends of their several flues, is a space or chamber, in which dampers *r*, operated from the outside of the furnace by suitable rods, are so arranged that the heat may be directed by them from each fire-place into its own flue, or so that the heat from all or from any number of the fire-places can be directed into a single flue. (See Fig. 6.) At the back of each fire-place, and above its grate-bars, is an opening, in which is arranged a regulator, *s*, for the admission of external air. This regulator consists of a number of slats hinged and connected together by a single rod, like those of a window-blind. When the slats are turned downward, as seen in Fig. 5, the air passing between them is directed upon the fire, and becomes heated before passing into the flues above; but when the slats are turned horizontally, a greater volume of air is admitted into the fire-place, but is not so highly heated, as it is not brought so directly in contact with the fire, while, if the slats are turned upward, the air, in a still cooler state, will pass directly into the flue. Each of the drying-chambers is furnished, at as high a point as possible, with two ventilators, *t t*, which extend to the top of the kiln, the steam and moisture from the upper drying-chamber being carried off through the central flue *a* before mentioned, although this latter chamber may, if required, be furnished with ventilators *t*.

The method of using my improved kiln is as follows: The malt, having been prepared for drying in the usual manner, is shoveled from the floors of the malt-house through the doors *m*, and spread upon the floors of the several drying-chambers, the greater height of the partitions *i* at the side next to the door enabling the attendants to turn the malt without stooping, except when close to the flues, which, owing to the limited height of the stories, they could not do if the partitions were inclined in the opposite direction. The heated air from the several fire-places, when the whole kiln is in operation, rises through the flues *p*, and passes into the spaces Q beneath the drying-chambers, and thence through the perforations of the floor C′, and through the mass of malt, which has to be frequently turned by shovels until the drying is complete, the vapor as it rises from the malt not being suffered to remain in the drying-chambers, but passing off immediately through the ventilators *t t*. The inclined partitions *i* serve to direct the heat, as it passes from the flues, both upward and outward, so as to equally diffuse it throughout the spaces Q, and thus cause it to pass uniformly upward through the perforations of the drying-floors and the malt resting thereon.

The arrangement of the drying-floors for each malting-floor in connection with the arrangement of the inclined partitions *i* increases the capacity of a drying-kiln of any given size, and enables the kiln to be made of less size than would otherwise be required, while the manipulation of the malt is facilitated, and the quality of the latter improved, as comparatively few of the grains are crushed or injured.

It is not necessary that all of the drying-chambers should be in operation at one time, as they are entirely independent of each other, and the heat which passes to each chamber can be so regulated by the valves *s* and dampers *r*, before described, that malt of any quality, whether high-dried, amber, or pale, can be produced.

What I claim as my invention is—

1. The combination, in a malt-house, of the floors of the drying-chambers, arranged on a level, or thereabout, with the adjacent growing or malting floors, the inclined partitions *i*, and apertures for the admission and escape of hot air from the drying-chambers, substantially as and for the purpose hereinbefore set forth.

2. The combination and arrangement of the fire-places $o$ $o^1$ $o^2$, &c., flues *p p*, &c., and dampers *r*, that the heat from one or any number of the fire-places may be directed in the manner and for the purpose set forth.

3. The slatted valves *s*, arranged at the back of each fire-place, for the purpose of regulating the supply and direction of cold air into the same, substantially in the manner described.

W. W. HUGHES.

Witnesses:
JAY HYATT,
GEO. GOLDTHORP.